United States Patent
Strack (10) Patent No.: US 7,574,410 B2
(45) Date of Patent: Aug. 11, 2009

(54) FAST 3D INVERSION OF ELECTROMAGNETIC SURVEY DATA USING A TRAINED NEURAL NETWORK IN THE FORWARD MODELING BRANCH

(75) Inventor: Kurt M. Strack, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 243 days.

(21) Appl. No.: 11/507,897

(22) Filed: Aug. 22, 2006

(65) Prior Publication Data

US 2008/0071709 A1    Mar. 20, 2008

(51) Int. Cl.
G05B 13/04 (2006.01)
(52) U.S. Cl. ........................................................ 706/21
(58) Field of Classification Search ................. 324/332, 324/323, 336; 706/20, 21
See application file for complete search history.

(56) References Cited

U.S. PATENT DOCUMENTS

| | | | |
|---|---|---|---|
| 5,647,018 A | 11/1995 | Rueter et al. | |
| 5,563,513 A | 10/1996 | Tasci et al. | |
| 5,862,513 A * | 1/1999 | Mezzatesta et al. | 702/9 |
| 5,883,515 A * | 3/1999 | Strack et al. | 324/339 |
| 5,955,884 A * | 9/1999 | Payton et al. | 324/339 |
| 6,541,975 B2 * | 4/2003 | Strack | 324/323 |
| 6,603,313 B1 * | 8/2003 | Srnka | 324/354 |
| 6,628,119 B1 | 9/2003 | Eidesmo et al. | |
| 6,670,813 B2 | 12/2003 | Strack | |
| 6,739,165 B1 * | 5/2004 | Strack | 702/13 |
| 6,842,006 B2 | 1/2005 | Conti et al. | |
| 6,859,038 B2 | 2/2005 | Ellingsrud et al. | |
| 2003/0184299 A1 * | 10/2003 | Strack | 324/323 |
| 2005/0077902 A1 | 4/2005 | MacGregor et al. | |

* cited by examiner

*Primary Examiner*—David R Vincent
*Assistant Examiner*—Nathan H Brown, Jr.
(74) *Attorney, Agent, or Firm*—Richard A. Fagin; Adenike A. Adebiyi

(57) ABSTRACT

A method for interpreting electromagnetic survey data includes acquiring electromagnetic survey data near a top of a portion of the Earth's subsurface. An initial model of the portion of the Earth's subsurface is generated. The model includes at least spatial distribution of formation resistivity within the portion. The initial model is applied to an artificial neural network trained to generate expected electromagnetic survey instrument response to the initial model. The acquired electromagnetic survey data are compared to an output of the artificial neural network. The initial model is adjusted, and the applying the model to the artificial neural network and the comparing are repeated until differences between the output of the network and the acquired survey data fall below a selected threshold.

28 Claims, 7 Drawing Sheets

FAST 3D INVERSION OF ELECTROMAGNETIC SURVEY DATA USING A TRAINED NEURAL NETWORK IN THE FORWARD MODELING BRANCH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic geophysical surveying. More specifically, the invention relates to inversion processing techniques for interpreting electromagnetic surveys in which artificial neural networks are used to generate forward response models of the survey equipment for such inversion processing.

2. Background Art

Electromagnetic survey systems and methods provide a variety of data about formations through which the well extends; including, for example, spatial distribution of resistivity in the Earth's subsurface. Such data are interpreted and evaluated, among other purposes, to improve prediction of oil and gas production from a given reservoir or field, to detect new oil and gas production zones, to provide a picture or model of subsurface formations and of reservoirs to facilitate the removal of hydrocarbons, and to enhance the process of well location.

Inversion processing provides an estimate of the material properties of a formation and/or spatial distribution of such properties in the Earth's subsurface by updating and improving an initial model of the subsurface containing a material property description of the subsurface. The updating is performed with successively better models until an optimal model is obtained. In inversion processing, a geophysical surveying instrument response to the initial Earth model is numerically calculated, typically from a set of response equations intended to represent the instrument response. The response actually measured by such instrument; if it matches the calculated response, determines that the initial Earth model is substantially correct. If the calculated response and the measured response do not substantially match, the initial model is changed or adjusted to improve the match between the measured response and the calculated response. The update can be performed by known linear optimization methods. See, e.g., *Inverse Problem Theory*, Tarantola, 1987. Non-linear optimization methods can also be used. See, e.g., *Genetic Algorithms and Very Fast Simulated Reannealing*, Ingber and Rosen, 1992. Numerical calculation of geophysical instrument responses, and in particular electromagnetic survey instrument responses, is relatively slow, even on relatively powerful computers.

An artificial neural network provides a powerful tool for interpolation between an input data set and an output data set through a distributed set of weights. The interpolation is attained by a relatively small number of multiplications and additions which can be several orders of magnitude faster than the numerical computation of survey instrument response using standard electromagnetic propagation theory. ANNs are described generally in U.S. Pat. No. 5,554,273, for example.

Certain artificial neural networks ("ANN") known in the art consist of a lattice arrangement of neurons, or nodes, connected by synapses or links similar conceptually to the functions imputed to the neurons in the human brain. Complex ANN structures have been built using sophisticated interconnections of simple building blocks or nodes. Layers of nodes are created and interconnections established between adjacent layers, called a feedforward network. Other ANN architectures include connections between non-adjacent layers and to additional networks, called recurrent ANNs. Nodes can also be arranged into a map and connections between the nodes created and modified during training of the network as in Self Organizing Maps. See, for example, *Self-Organization and Associative Memory*, Kohonen, 1984.

In the human brain, information is processed by summation of all electrical impulses into a neuron which then causes the neuron to emit its own signal. Upon receiving the input electrical signals, the neuron modifies them, changing their amplitude and frequency, using an activation function. The input signals are then summed before the neuron outputs its own signal. In a similar fashion, signals input into an ANN are changed by multiplying the input by an activation function and by a scalar value called a weight. The weights and the activation function can vary from node to node in the ANN. Typically, the input (x) and the output (f(x)) values from a node are give by the expression:

$$f_k(x) = \Sigma w_{kj} R(x) \qquad (1)$$

where $f_k(x)$ is the output from the k-th node, $w_{kj}$ are the weights connecting the j-th node to the k-th node and R is the activation function. Typically R is a hyperbolic tangent (tan h(x)). After calculating the value of the activation function, the new input values for the node are summed and the output value is passed onto all the neurons directly connected with the stimulated node. The signal feeds through the network to the output nodes where the response is saved. Like the human brain, ANN's can be trained to recognize patterns or to provide an appropriate response to a given input. The weights of the network are modified during training until the output response to any given input is correct.

By using empirical pattern recognition, ANNs have been applied in many areas to provide sophisticated data processing solutions to complex and dynamic problems (i.e. classification, diagnosis, decision making, prediction, voice recognition, military target identification, to name a few). Similar to the human brain's problem solving process, ANNs use information gained from previous experience and apply that information to new problems and/or situations. The ANN uses a "training experience" (data set) to build a system of neural interconnects and weighted links between an input layer (independent variable), a hidden layer of neural interconnects, and an output layer (the results, i.e. dependant variables). No existing model or known algorithmic relationship between these variables is required, but could be used to train the ANN. An initial determination for the output variables in the training exercise is compared with the actual values in a training data set. Differences are back-propagated through the ANN to adjust the weighting of the various neural interconnects, until the differences are reduced to the user's error specification. Due largely to the flexibility of the learning algorithm, non-linear dependencies between the input and output layers, can be "learned" from experience. Several references disclose various methods for using ANNs to solve various drilling, production and formation evaluation problems. These references include U.S. Pat. No. 6,044,325 issued to Chakravarthy et al, U.S. Pat. No. 6,002,985 issued to Stephenson et al, U.S. Pat. No. 6,021,377 issued to Dubinsky et al, U.S. Pat. No. 5,730,234 issued to Putot, U.S. Pat. No. 6,012,015 issued to Tubel and U.S. Pat. No. 5,812,068 issued to Wisler et al.

In prior art techniques for training an ANN, a training set of examples is created, typically by using standard numerical simulation techniques. A training set can contain thousands of members generated from thousands of different models. Training consists of refining the set of weights of the nodes so that any given input model produces a correct output response. At the start of training, node weights are randomly selected. A model corresponding to a member of the training set is input to the neural network and one or more outputs are generated by the network. The one or more outputs are compared with raw data or a numerical estimate based on raw data. If the outputs do not match the data, the weights are then adjusted, either by back propagation (see, e.g., U.S. Pat. Nos. 5,134,685 and 5,107,442), or a non-linear optimization method such as simulated annealing to improve the match between the two sets of data. The members of the training set are input to the network one at a time until all the members have been input. All the output data and the simulation data are compared and when the weights have stabilized, i.e., when they do not change during continued training, or exposure to the training set, and the output matches the expected output for all the members of the training set, then the ANN is considered trained. An input data set that is not in the training set is then introduced into the ANN and the correct response is output. ANNs also have some ability to extrapolate responses when faced with a model containing values outside those with which it was trained.

Electromagnetic surveying, such as includes but is not limited to controlled source electromagnetic surveying, is a technique wherein an electric or magnetic field is imparted into the Earth's subsurface from the top of an area of the subsurface that is to be surveyed. Among other methods are magnetotellurics and borehole-to-surface electromagnetics. The electric and/or magnetic fields generated in response to the imparted field are measured, also at the top of the area being surveyed. Various techniques, including inversion processing, are used to infer the spatial distribution of resistivity in the Earth's subsurface in the survey area. Because of the complexity of the electromagnetic instrument response in evaluating the structure of the Earth's subsurface in three dimensions, electromagnetic survey interpretation has proven to be difficult and time consuming. A particular issue in interpreting electromagnetic survey data is the complexity of forward instrument response modeling in inversion processing using deterministic solutions. What is needed is an improved technique for forward response modeling to be used in inversion processing of electromagnetic survey data.

SUMMARY OF THE INVENTION

A method for interpreting electromagnetic survey data according to one aspect of the invention includes acquiring electromagnetic survey data near a top of a portion of the Earth's subsurface. An initial model of the portion of the Earth's subsurface is generated. The model includes at least spatial distribution of formation resistivity within the portion. The initial model is applied to an artificial neural network trained to generate expected electromagnetic survey instrument response to the initial model. The acquired electromagnetic survey data are compared to an output of the artificial neural network. The initial model is adjusted, and the applying the model to the artificial neural network and the comparing are repeated until differences between the output of the network and the acquired survey data fall below a selected threshold.

Other aspects and advantages of the invention will be apparent from the following description and the appended claims.

DETAILED DESCRIPTION

1. Acquisition of Electromagnetic Survey Data

Aside from logistical details, the techniques discussed herein are equally applicable to marine, land, and borehole-to-surface surveys, although most of the description is made with reference to marine surveys. Accordingly, the invention is not limited in scope to use only with marine surveys. Further, the embodiments of electromagnetic survey information described below relate to controlled source, transient electromagnetic surveys. The methods described below are equally applicable to controlled source, frequency domain electromagnetic surveys as well as natural source surveys, such as magnetotelluric surveys.

Figure 1A:
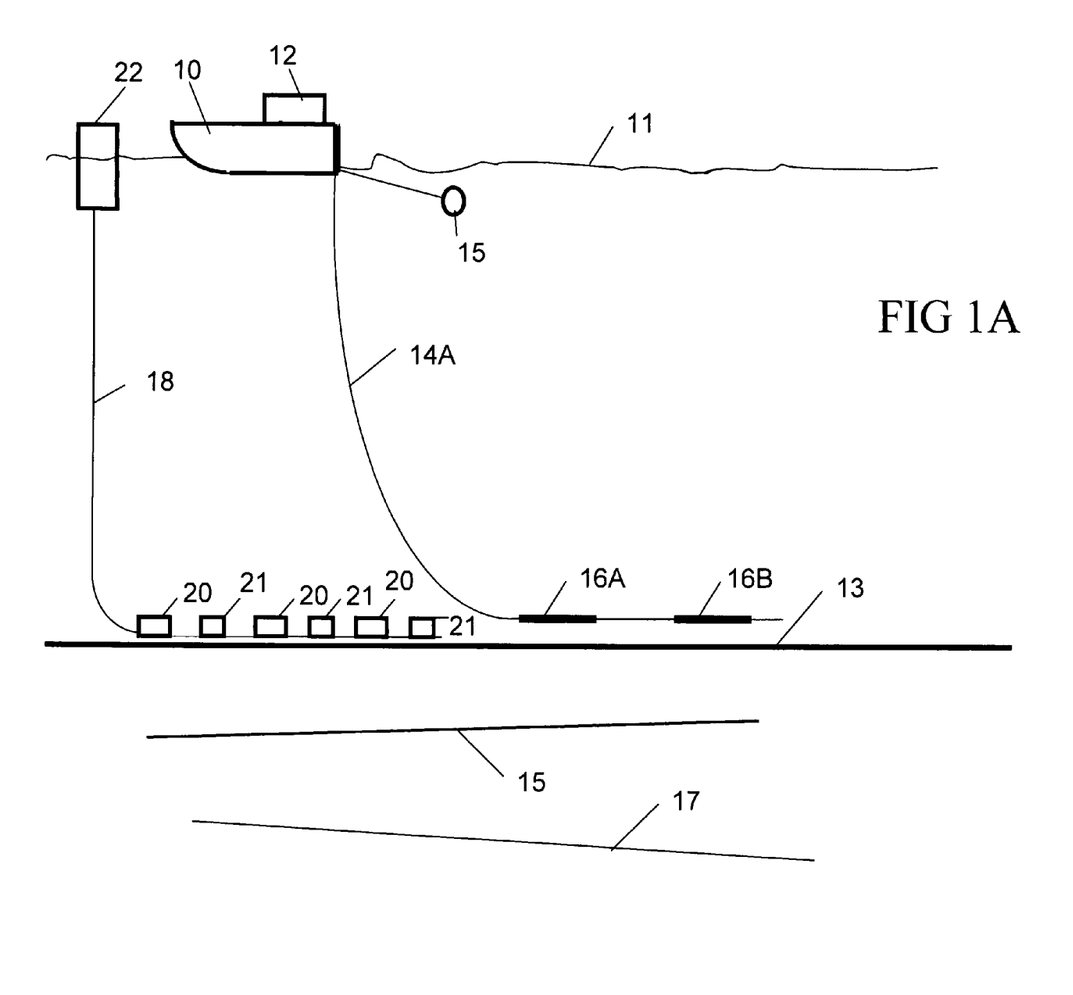
FIG. 1A shows a marine transient electromagnetic survey system using a horizontal electric dipole current source.

FIG. 1A shows one embodiment of a marine transient controlled source electromagnetic (t-CSEM) survey system for use with methods according to various aspects of the invention. The system includes a survey vessel 10 that moves in a predetermined pattern along the surface of a body of water 11 such as a lake or the ocean. The vessel 10 includes thereon source actuation, signal recording and navigation equipment, shown generally at 12 and referred to herein as the "control/recording system." The control/recording system 12 includes a controllable source of electric current (not shown separately) used to energize electrodes 16A 16B towed in the water 11 near the bottom 13 thereof to impart an electric field in subsurface formations 15, 17 below the bottom 13 of the water 11. The control/recording system 12 typically includes instrumentation (not shown separately) to determine the geodetic position of the vessel 10 at any time, such as can be performed using global positioning system (GPS) receivers or the like. The control/recording system 12 in the present embodiment can include equipment to transfer signals from one or more recording buoys 22. The recording buoys 22 receive and store signals from each of a plurality of electromagnetic (EM) sensors 20 positioned at selected positions on the water bottom 13. The sensors 20 may be disposed along a cable 18. The cable 18 may be of a type ordinarily used in connection with seismic sensors deployed on the water bottom known in the art as "ocean bottom cables." The sensors 20 detect electric and/or magnetic fields that result from electric fields induced in the Earth's subsurface by current passing through the electrodes 16A, 16B. The sensors 20 will be explained in more detail below with reference to FIG. 3. The recording buoys 22 may include telemetry devices (not shown separately) to transmit data from the received signals to the vessel 10, and/or may store the signals locally for later interrogation by the control/recording system 12 or by another interrogation device. Alternatively, the sensors' signals may be locally and autonomously recorded, and such recordings may be retrieved at the end of the survey.

The current source (not shown separately) on the vessel 10 is coupled to the electrodes 16A, 16B by a cable 14A. The cable 14A is configured such that the electrodes 16A, 16B can be towed essentially horizontally near the water bottom 13 as shown in FIG. 1A. In the present embodiment, the electrodes can be spaced apart about 50 meters, and can be energized such that about 1000 Amperes of current flows through the electrodes 16A, 16B. This is an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) switched off at a signal recording time index equal to zero. It should be understood, however, that switching DC off is only one implementation of electric current change that is operable to induce transient electromagnetic effects. In other embodiments, the electric current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source.* Geophysics, 45, 1276-1296 for a description of PBRS switching.

In the present embodiment, as the current through the transmitter electrodes 16A, 16B is switched, a time-indexed recording of electric and/or magnetic fields detected by the various sensors 20 is recorded, either in the recording buoys 22 and/or in the control/recording system 12, depending on the particular configuration of recording and/or telemetry equipment in the recording buoys 22 and in the control/recording system 12.

Figure 1B:
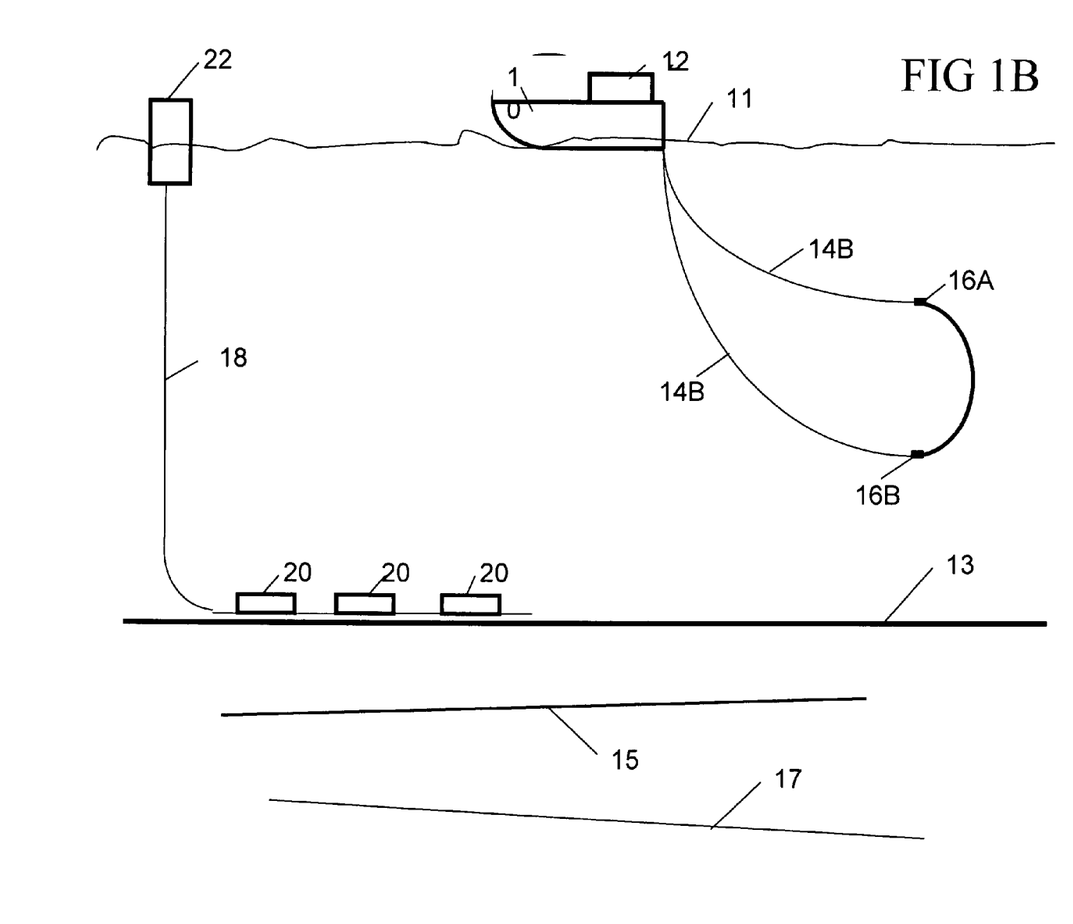
FIG. 1B shows a marine transient electromagnetic survey system using a vertical electric dipole current source.

FIG. 1B shows an alternative implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 1B. Energizing the electrodes 16A, 16B, detecting and recording signals is performed substantially as explained above with reference to FIG. 1A.

Figure 1C:
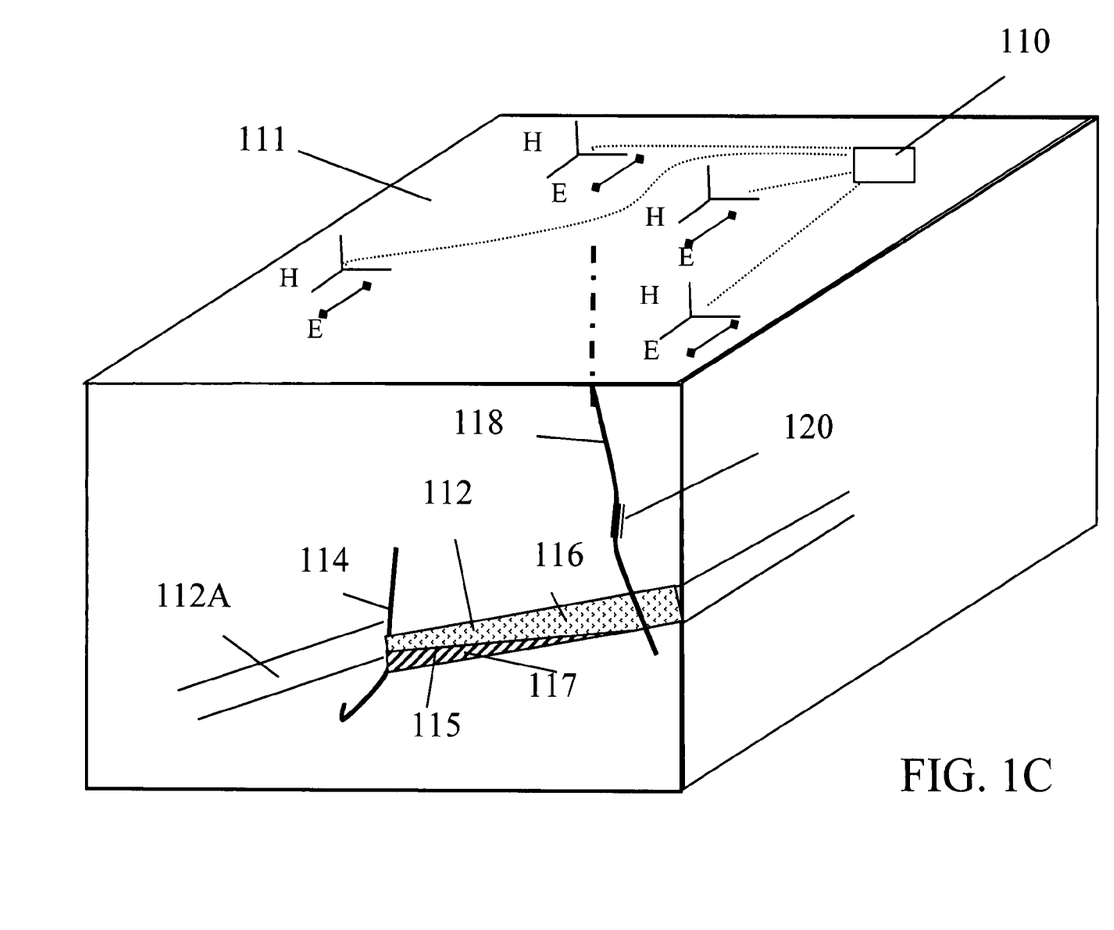
FIG. 1C a borehole-to-surface electromagnetic survey setup.

FIG. 1C schematically shows one example of a combined measurement system that may be used to acquire data processed according to the invention. Such system is disclosed in U.S. Pat. No. 6,739,165, assigned to the assignee of the present invention and incorporated herein by reference. In this embodiment, a plurality of magnetotelluric (MT) sensors, each shown as a triaxial (three component) magnetic field sensor, generally at H, and an electric field component sensor, generally at E, is deployed in a selected arrangement or pattern on the surface 111 of the Earth. The sensors E and H preferably are deployed near the subsurface location of a petroleum producing reservoir 112 which is to be monitored. The sensors E, H may be permanently deployed near the surface or in the subsurface, but in some embodiments may be deployed only at the time MT measurements are to be made.

Measurements made by the sensors E, H are conducted to a recording unit 110 for recording and/or processing by one or more methods according to the invention. The embodiment of the sensors E, H shown in FIG. 1C may be sensors typically used on dry land surface, or may be marine MT sensors of any type known in the art. An example of a sea floor MT sensor system is shown U.S. Pat. No. 5,770,945. The exact number of and arrangement of MT sensors will depend on such factors as the geographic extent of the reservoir 112 and the depth of the reservoir 112, among other factors. The number of and arrangement of MT sensors is therefore not a limitation on the scope of the invention.

The reservoir 112 may be any type of permeable Earth formation known in the art to produce, for example, petroleum from within pore spaces of the rock forming the reservoir 112. In this example, the reservoir may extend, at 112A, across a fault 114 or similar geologic discontinuity which forms a suitable structure or "trap" on one side of the fault 114. In this example, the reservoir 112 includes an oil bearing zone 116 disposed generally above a water bearing zone 117. As is known in the art, as oil is removed from the oil bearing zone 116, in many reservoirs connate water in the water bearing zone 117 moves into the pore spaces in the reservoir 112 vacated by the extracted oil.

The present embodiment of the system includes at least one monitor wellbore 118 that is drilled close to or through the reservoir 112. The monitor well 118 includes therein at least one sensor 120 the response of which is at least partially dependent on the overall fluid content of the reservoir 112. For example, an acoustic velocity (interval transit time) sensor, a seismic sensor (hydrophone or geophone) and an electrical resistivity sensor all have response at least partially dependent on the fluid content of the reservoir 112. Other types of sensors that are useful with the invention include gravity sensors, neutron capture cross-section sensors and bulk density sensors. Each of the foregoing types of sensors is well known in the art, as well as operation thereof.

As oil is removed from the reservoir 112, a position of a fluid contact 115 may change, generally moving upwardly as the oil is removed. A characteristic of the reservoir 112 such as electrical resistivity or acoustic impedance, may change as the fluid contact 115 moves within the reservoir 112. In some embodiments, the monitor wellbore 118 may be one from which fluids are extracted from the reservoir 112. In other embodiments, the monitor wellbore 118 may be a separate wellbore from which no fluid extraction takes place. Measurements from the at least one sensor 120 in the monitor wellbore 118 in some embodiments may be recorded in a storage device (not shown separately) and/or may be conducted to the recording unit 110 for recording and interpretation.

The at least one sensor 120 may be deployed in the monitor wellbore 118 by any one of a number of methods known in the art. In some embodiments, the sensor 120 is permanently emplaced in the monitor wellbore 118, such as by attachment to a wellbore pipe or casing (not shown). In other embodiments, the sensor 120 may be conveyed into the monitor wellbore 118 on an armored electrical cable (known as "wireline logging"). In still other embodiments, the sensor 120 may be conveyed at the end of a drill pipe or coiled tubing (known as "pipe conveyed logging").

In some embodiments, there may be more than one monitor wellbore and associated sensor disposed therein. Using a plurality of monitor wells and associated sensors may provide increased coverage area for determining movement of fluids in a reservoir having a larger geographic extent. In other embodiments, more than one reservoir may be monitored within a particular geographic area. In some embodiments, one or more purposely drilled monitor wells may each have a permanently emplaced sensor, and other wellbores drilled through the reservoir 112 for the purpose of producing oil and/or gas may be used at selected times for the purpose of obtaining reservoir monitoring measurements by conveying a selected type of sensor such as by wireline or pipe conveyance.

In one embodiment of a method according to the invention, a first set of MT measurements is made and preferably recorded before oil and/or gas production is begun from the reservoir, or shortly after oil and/or gas production is started. A first set of measurements is also made from the at least one sensor 120 in the monitor wellbore 118 at or near the same time.

In the one embodiment, a first Earth model is generated. The first Earth model represents the subsurface geologic structure, including a first or initial position of the contact 115. The initial structure may be determined using surface seismic surveying in combination with any one or more well known subsurface mapping techniques, including using well logs from any one or more wellbores drilled through the reservoir and/or the sensor 120 measurements from the monitor wellbore 118. The first set of MT measurements and first set of sensor measurements thus correspond to an initial fluid condition in the reservoir 112. Alternatively, the first Earth model may be determined by inversion processing the MT measurements and the sensor 120 measurements such that a structure of the Earth, including the structure of and the position of the contract 115 known from, for example, well log measurements and/or surface seismic measurements, most closely matches a predicted set of MT measurements made from the Earth structure and a predicted set of measurements from the sensor 20.

As fluid is withdrawn from the reservoir 112, additional sets of MT measurements may be made and combined with subsequent measurements from the sensor 120 made at selected times. Changes in position of the contact 115 at locations away from the monitor wellbore 118 may be determined by inversion processing the MT measurements and sensor 120 measurement as is done for the initial measurement set (a measurement set including MT measurements and sensor measurements).

In some embodiments, it may prove useful to include measurements from other wellbores drilled through the reservoir 112, in order to improve the accuracy with which the contact 115 is mapped at locations distant from the monitor wellbore 118. Such wellbores may include, as previously explained, fluid producing wellbores and/or purposely drilled monitor wellbores. In such embodiments, measurements from sensor (s) in the one or more monitor wellbores are used in combination with measurements made at the Earth's surface to map or determine the geometric distribution of the contact 115 at selected times. As will be readily appreciated by those skilled in the art, the number of monitor wellbores, the number of permanently emplaced sensors and the number of and types of sensors can be selected to best suit the particular type of reservoir being monitored, Reservoir parameters which may affect the selection of types of and numbers of wellbore-placed sensors include permeability of the reservoir, conductivity contrast between the hydrocarbon bearing part of the reservoir and any connate water bearing part of the reservoir, and the geographic extent of the reservoir. For example, a reservoir extending over a very large geographic area may be more accurately monitored using a larger number of spaced apart monitor wells than a more geographically compact reservoir. Correspondingly, a reservoir formation having high vertical permeability may be more accurately monitored using more closely spaced monitor wellbores. Accordingly, the number of monitor wellbores, and whether such wellbores include permanently emplaced or removable conveyed sensors (such as by drill pipe or wireline conveyance) are not intended to limit the scope of the invention.

The sensor 120, if it is a seismic and/or gravity sensor, may be moved along the wellbore to acquire a vertical seismic-.gravimetric profile (VSP/VGP) survey according to techniques well known in the art. Such VSP/VGP survey may be used to constrain an inversion process as will be further explained below.

Referring once again to FIG. 1A, in some embodiments, the vessel 10 may also be used to tow a seismic energy source, shown generally at 9. The seismic energy source is typically an array of air guns, but can be any other type of seismic energy source known in the art. The control/recording system 12 in such embodiments includes control circuits (not shown separately) for actuating the seismic source 9 at selected times, and recording circuits (not shown separately) for recording signals produced by seismic sensors. In such embodiments, the ocean bottom cables 18 may also include seismic sensors 21. The seismic sensors 21 are preferably "four component" sensors, which as known in the art include three orthogonal geophones or similar motion or acceleration sensors collocated with a hydrophone or similar pressure responsive sensor. Four component ocean bottom cable seismic sensors are well known in the art. See, for example, U.S. Pat. No. 6,021,090 issued to Gaiser et al.

Figure 2:
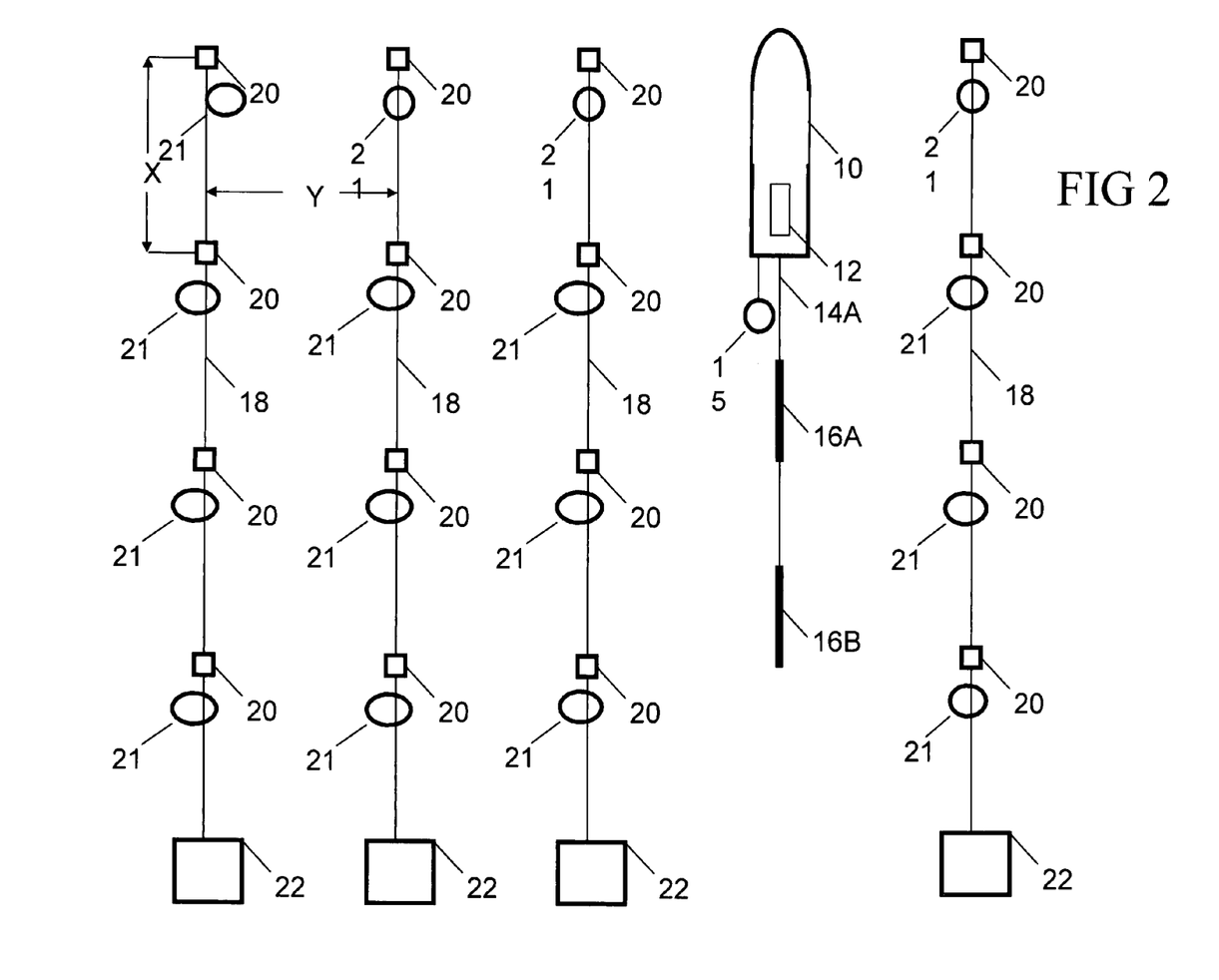
FIG. 2 shows an array of t-CSEM sensors disposed in a plurality of ocean bottom cables for acquiring a survey according to the invention.

FIG. 2 shows a typical arrangement of ocean bottom cables 18 having EM sensors 20 at spaced-apart positions thereon for acquiring a three dimensional t-CSEM survey according to the invention. Each cable 18 may be positioned essentially along a line in a selected direction above a portion of the Earth's sub surface that is to be surveyed. The longitudinal distance between the EM sensors 20 on each cable is represented by x in FIG. 2, and in the present embodiment may be on the order of 100 to 200 meters. Each cable 18 is shown as terminated in a corresponding recording buoy 22, as explained above with reference to FIG. 1A. The cables 18 are preferably positioned substantially parallel to each other, and are separated by a lateral spacing shown by y. In the present embodiment, y is preferably substantially equal to x, and is on the order of about 100 to 500 meters. In some embodiments, the EM sensors 20 may be randomly distributed, that is, spacings x and y between adjacent sensors may be random. It is only necessary in such embodiments to know the geodetic position of each sensor, and that the average separation is as above. It is believed that random spacing may improve signal to noise ratio in the results of an electromagnetic survey.

For a two dimensional survey, only one such line of receivers is required, and the vessel 10 may pass only once along this line.

In conducting a survey, the vessel 10 moves along the surface of the water 11, and periodically the control/recording system 12 energizes the transmitter electrodes 16A, 16B as explained above. In some embodiments, the transmitter electrodes 16A, 16B are energized at selected times such that the vessel 10 moves about 10-100 meters between successive energizations of the transmitter electrodes 16A, 16B. Signals detected by the various EM sensors 20 are recorded with respect to time, and such time is indexed related to the time of energizing the electrodes 16A, 16B. By recording with such time indexing, inferences concerning the structure and composition of the Earth's subsurface may be made from the recordings. In the present embodiment, the vessel 10 is shown moving substantially parallel to the cables 18. In one embodiment, after the vessel 10 moves in a direction parallel to the cables 18, substantially above the position of each cable 18 on the water bottom 13, then the vessel 10 may move transversely to the cables 18, along sail lines substantially above the position of corresponding EM sensors 20 on each cable 18 on the water bottom 13. The reason for the parallel and transverse movement of the vessel 10 will be further explained below.

In some embodiments, a substantially contemporaneous seismic survey may be conducted by periodically actuating the seismic energy source 9, and recording the signals detected by the seismic sensors 21. Interpretation of the seismic signals may be performed using techniques known in the art.

In the present embodiment, a plurality of measurements are made at each EM sensor 20, each representing a unique geometry of the transmitter electrodes 16A, 16B with respect to each EM sensor 20. The plurality of measurements, each with a unique arrangement of transmitter-to-sensor geometry may be used in some embodiments to produce various forms of combined or "stacked" measurements, so as to improve the quality of images generated using t-CSEM measurements. The recordings of the signals from each of the EM sensors 20 may be corrected for the actual geometry of acquisition, such that effects of acquisition geometry may be corrected before any two or more recordings are "stacked" or summed. Those skilled in the art of seismic exploration will appreciate that such acquisition geometry correction is necessary in order to properly stack seismic recordings. Seismic recordings are commonly corrected prior to stacking by selecting seismic data recordings that represent acquisition of seismic signals having a "common mid point." Common mid point means that the location of the seismic energy source and the seismic receiver in any two recordings have the same mid point between them irrespective of the location of the source and receiver at each recording time. In the invention, signal recordings from the EM sensors (20 in FIG. 2) are selected for stacking such that the signal recordings also have a common mid point.

In seismic exploration, common mid point recordings are then processed by a procedure known as normal moveout correction. Normal moveout correction adjusts the timing of events in any seismic recording to that which would occur if the seismic energy source and the seismic receiver were collocated above the common mid point. The time correction thus adjusts event times in each recording to account for longer and longer energy travel paths for longer "offset" recordings. Such recordings are those made with longer and longer distances along the Earth's surface between the seismic energy source and the receiver.

As a generalized concept, correction for source-receiver offset in common mid point recordings can be applied to electromagnetic signal recordings. However, the correction is not necessarily made with respect to travel time. For example, one basis for correcting signal recordings for acquisition geometry is the signal amplitude. For a signal recording made using electric current amplitude represented by I, and an electrode spacing represented by $\Delta l$, the DC electric field strength E in the inline direction can be determined by the expression:

$$E(\rho) = \frac{I\Delta\lambda}{\pi\sigma_0(1+\sigma_1/\sigma_0)\rho^3} \quad (1)$$

in which $\sigma_1$ represents the electrical conductivity of the subsurface, $\sigma_0$ represents the electrical conductivity of the water, and $\rho$ represents the transmitter to receiver distance or offset (cf. Edwards, R. N., and Chave, A., 1986, *A transient electric dipole-dipole method for mapping the conductivity of the sea floor*: Geophysics 51, 984-987). The electric field amplitude in the transverse direction is calculated by a formula with similar offset dependence. Similar formulas can also be derived for magnetic field strength. As a result, the electric field at offset $\rho$ may be corrected to that at $\rho_0$ (zero offset) the equation $$E(\rho_0) = E(\rho)\frac{\rho^3}{\rho_0^3} \quad (2)$$

After such correction, recordings acquired with different offsets may be stacked. In some embodiments, the stacking may be a form of stacking known as median stacking so as to further reduce transient noise effects in the stacked recording.

After stacked recordings are generated for a plurality of common mid points, each representing a different geodetic position in the Earth, an image of the Earth's subsurface may be generated using a plurality of stacked recordings. Generating the image may be performed using well known seismic image generating techniques. As a minimum, generating an image may include calculating at least one property of the electromagnetic measurements at a selected time using the stacked recordings. A property may include amplitude, phase or the like. The property may be used to determine a petrophysical property, or may be correlated to petrophysical properties determined from other measurements to determine a property of the Earth's subsurface at the common mid point.

Figure 3:
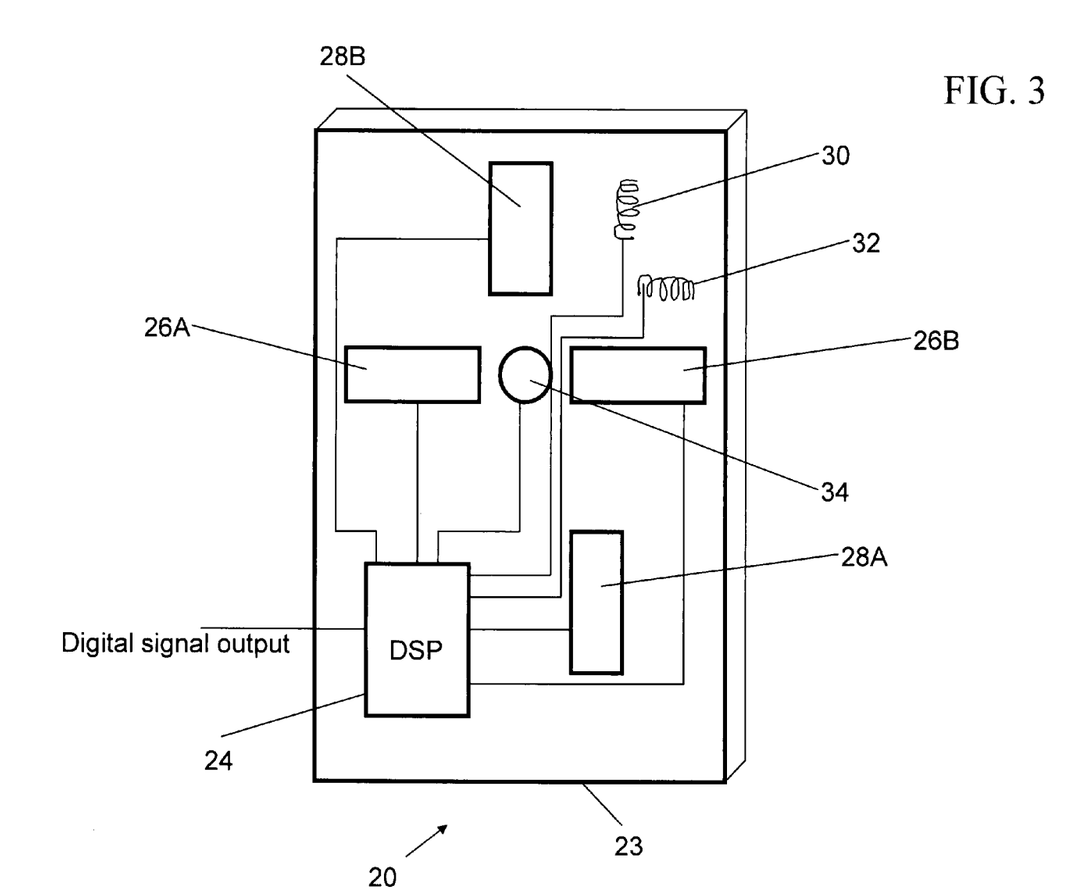
FIG. 3 shows one embodiment of an ocean bottom t-CSEM system sensor.

FIG. 3 shows one embodiment of an EM sensor 20 in more detail. The EM sensor 20 may be enclosed in a housing 23 made from a dense, electrically non-conductive, non-magnetic material, such as high-density plastic, such that the EM sensor 20 will sink in the water and rest on the water bottom (13 in FIG. 1A). Electrodes 26A, 26B, 28A, 28B are positioned on the bottom of the housing 23 such that they contact the water bottom (13 in FIG. 1A). The electrodes are arranged in dipole pairs. One pair 26A, 26B can be oriented along the length of cable (18 in FIG. 2), and measures voltages along the direction of the cable. The other electrode pair 28A, 28B measures voltages induced transversely to the cable (18 in FIG. 2). The electrode pairs may span a distance of about 1 to 10 meters. The electrode pairs 26A, 26B and 28A, 28B may be coupled to a combined amplifier/digital signal processor 24 for converting the detected voltages into digital words corresponding to the voltage amplitude at selected moments in time. The present embodiment of the sensor 20 may include one or more magnetometers 30, 32, 34 oriented along mutually orthogonal directions. In the present embodiment, two of the magnetometers 30, 32 may be oriented such that their sensitive axes are oriented along the same direction as the dipole moment of a corresponding electrode pair 26A, 26B and 28A, 28B. The signal output of each magnetometer 30, 32 34 may be coupled to the digital signal processor 24. The digitized signal output of the signal processor 24 can be coupled to the recording buoy (22 in FIG. 2) for transmission to the control/recording system (12 in FIG. 1A) or later interrogation by the control/recording system (12 in FIG. 1A).

Figure 4:
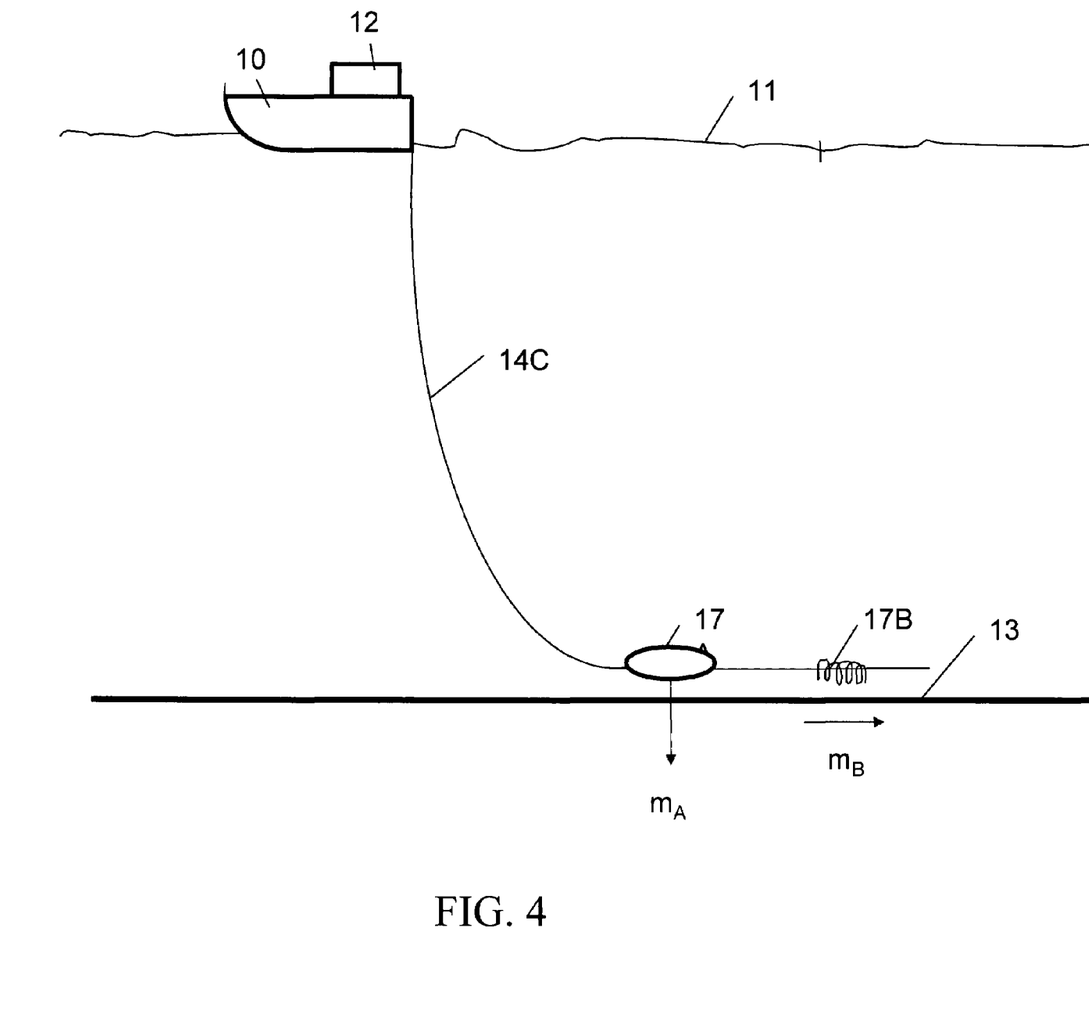
FIG. 4 shows an alternative way to energize the Earth using magnetic fields.

The embodiment of a system shown in FIG. 1A and FIG. 1B uses electric current applied to electrodes to impart an electric field into the Earth's subsurface. An alternative to imparting electric fields is to impart magnetic fields, and such will be explained with reference to FIG. 4. In FIG. 4, the vessel 10 tows a cable 14C which is connected to two loop transmitters 17A and 17B. The first loop transmitter 17A encloses an area perpendicular to the water bottom 13. Periodically, the control/recording system 12 causes electric current to flow through the first loop transmitter 17A. The current can be in any of the same forms as described with reference to FIG. 1A, including switched DC, PBRS, and alternating polarity DC. When the current changes, a transient magnetic field having dipole moment along direction $M_A$ is imparted into the Earth. At the same or at different times, current is applied to the second loop transmitter 17B. The second loop transmitter may be in the form of a solenoid or coil, having a magnetic moment along direction $M_B$. Surveying using the magnetic field loop transmitters 17A, 17B may be performed substantially according to the survey pattern explained above with reference to FIG. 2.

The embodiments explained above with reference to FIG. 4, and the embodiments explained previously with reference to FIGS. 1A and 1B show magnetic and/or electric dipoles along orthogonal directions. In some embodiments, orthogonal dipole antennas and/or current loops may be used to induce rotating electric and/or magnetic fields in the Earth's subsurface. Methods for generating rotating electric and/or magnetic fields are known in the art and include applying selected fractional amounts of the total electric current to the orthogonal antennas and/or current loops.

The foregoing embodiments have been explained in the context of marine electromagnetic surveying. It should be clearly understood that the foregoing embodiments are equally applicable to surveys conducted on land at the surface of the Earth. When conducted on land at the surface of the Earth, the sensors can be deployed in substantially similar patterns to that shown in FIG. 1. The survey current source may be applied in the form of electric current, as shown in FIG. 1A, at the Earth's surface, or in the form of magnetic fields, as shown in and described with reference to FIG. 4. For purposes of defining the scope of the invention, the various survey devices can be said to be disposed at the top of an area of the Earth's subsurface to be surveyed. The top of the Earth's subsurface will be at the bottom of the water in a marine survey, and at the surface of the Earth in a land based survey, or on the top of a layer of floating ice where such surveys are to be conducted.

Those skilled in the art will appreciate that the various embodiments described herein which include a moving electromagnetic energy source and stationary receivers are functionally equivalent to corresponding embodiments wherein the electromagnetic energy sources are stationary, such as being positioned on the water bottom in a pattern similar to those shown in the Figures where the EM sensors 20 are located, and electromagnetic sensors are moved through the water. Accordingly, in the appended claims, references to positions of electromagnetic sources and receivers are intended to include such corresponding source and receiver locations within their scope. The functional equivalence is a result of the principle of reciprocity, known to those skilled in the art.

2. Interpretation of the Electromagnetic Survey Data Using a Trained Artificial Neural Network as Part of an Inversion Processing Procedure Interpreting the electromagnetic survey data acquired as explained above may be performed using an inversion processing procedure. There are usually three steps in inversion processing. Step one includes deriving physical parameters such as resistivities of and thicknesses of the various strata in a portion of the Earth's subsurface in order to describe the spatial distribution of such parameters in three dimensions. The parameters can vary discretely or may transition from layer to layer and position to position. In many cases an initial model of spatial distribution of resistivity is constraint by known features of the Earth's subsurface geology, such as the spatial distribution of a salt-sediment boundary or a sediment basement boundary. The model may also be constrained by well log data, and any additional interpretative results, for example, surface made gravity measurements whose interpretation suggests that there is a subsurface feature such as a salt overhang, but gravity interpretation cannot determine its spatial distribution. Compartmentalization of the initial model may be required from fluid production history. The initial model may also be constrained by interpretation of geophysical survey data such as seismic, borehole seismic, gravity, magnetics, well logs, fluid production history, etc.

Step 2 in inversion processing is forward instrument response modeling. Forward instrument response modeling is a process by which the initial model of the portion of the Earth's subsurface is used to generate an expected response of the electromagnetic survey instrument. Prior to the present invention, forward modeling of electromagnetic survey instruments was based only on deterministic application of first principles, for example, explicit solutions to Maxwell's equations. As will be explained below, in the invention, trained artificial neural networks can be used to generate the forward instrument response model.

Step 3 includes the model optimization sequences or inversion process. The results from an initial model are compared with the data and then changes to the model are derive and applied and forward modeling is carried out. While deriving the changes and comparing the results is a fast process, redoing the complex three-dimensional model is complex and in bets cases takes several hours, in most cases even days.

Three-dimensional electromagnetic forward instrument modeling known in the art prior to the present invention is complex and time consuming, mostly because forward modeling using Maxwell equations takes a substantial amount of computer processing time, and thus only limited models are available. At the same time addressing an interpretation problem in three dimensions is essential to match the instrument response to real subsurface structure and formation composition.

It is known in the art to use a trained neural network to perform forward instrument response modeling in the context of well logging. See, for example, U.S. Pat. No. 5,862,513 issued to Mezzatesta et al. In the method disclosed in the foregoing patent the artificial neural network is trained by calculating a statistically significant large number of models and training the neural network with such models (Monte Carlo style). Such training has shown some success in the context of well logging measurements. The success in well logging forward modeling is believed to be related to the fact that well logging measurements direct their sensitivity primarily along the direction of the layering of the subsurface Earth formations, and therefore forward response models may be relatively simple. Such training has been shown to be impractical for electromagnetic survey measurements, however, primarily because of the complexity of the models resulting from three dimensional variations in distribution of resistivities in the Earth's subsurface, and the fact that the measurement sensitivity is generally directed perpendicularly to the layering of the subsurface Earth formations. Layering often causes abrupt parameter changes which increase model complexity and thus requires more elaborate training strategies for the ANN.

In the present invention, a way to train an artificial neural network with relatively limited instrument response data sets is to classify the electromagnetic instrument response by geoelectric "type-curves." Type curve are characteristic responses of an electromagnetic instrument to three formation layers. Curve type A represents monotonically increasing resistivity. Curve type Q represents monotonically decreasing resistivity. Curve type K represents a "sandwiched resistor", meaning the center of the three layers is more resistive than the boundary layers and may be associated with hydrocarbon bearing formations. Curve type H represents a "sandwiched conductor" where the central layer is more conductive than the boundary layers, such as would be the case for a brine filled permeable formation Four or more layer response curves are made up of several three layer response curves.

Equivalent curve behavior, i.e. conductance, which represents the product of bed conductivity and thickness, or transverse resistance, which is the product of resistivity and thickness, change of resistivity structure, for example smooth change or sharp boundary change can also be used to characterize the instrument response and thereby reduce the number of data sets necessary to train the artificial neural network. The latter curve behaviors are measures of the sensitivity of the data to specific parameter changes which one can obtain, for example, using a one-step Jacobian derivative matrix.

Another way of instrument response classification is also to use an exclusion approach when not sufficient information is available. An example is the exclusion of certain geologic scenario like excluding a sub basalt problem or a sub-salt problem.

Once a data set is classified, one would retrieve from a data base of prior 3D models the most appropriate models and train the neural network. In addition, the selected models are used to generate new models by perturbing them or averaging them for further network training.

Additional neural network training may be performed using additional a priori information from the survey area, which may include information concerning at least one petrophysical parameter. Such information is used to derive 1D, 2D and 3D deterministic models. Physical variation based on the target scenario (i.e. changing the reservoir saturation from water to oil; or simulating a water/steam/gas flood) provide addition models for training the artificial neural network. The a priori information can also be used to constrain the search radius of model for the neural network and thus increase the training speed further. Similarly to using the response characteristics for training, a priori information can also be used to constrain the neural network in an exclusory manner.

Figure 5:
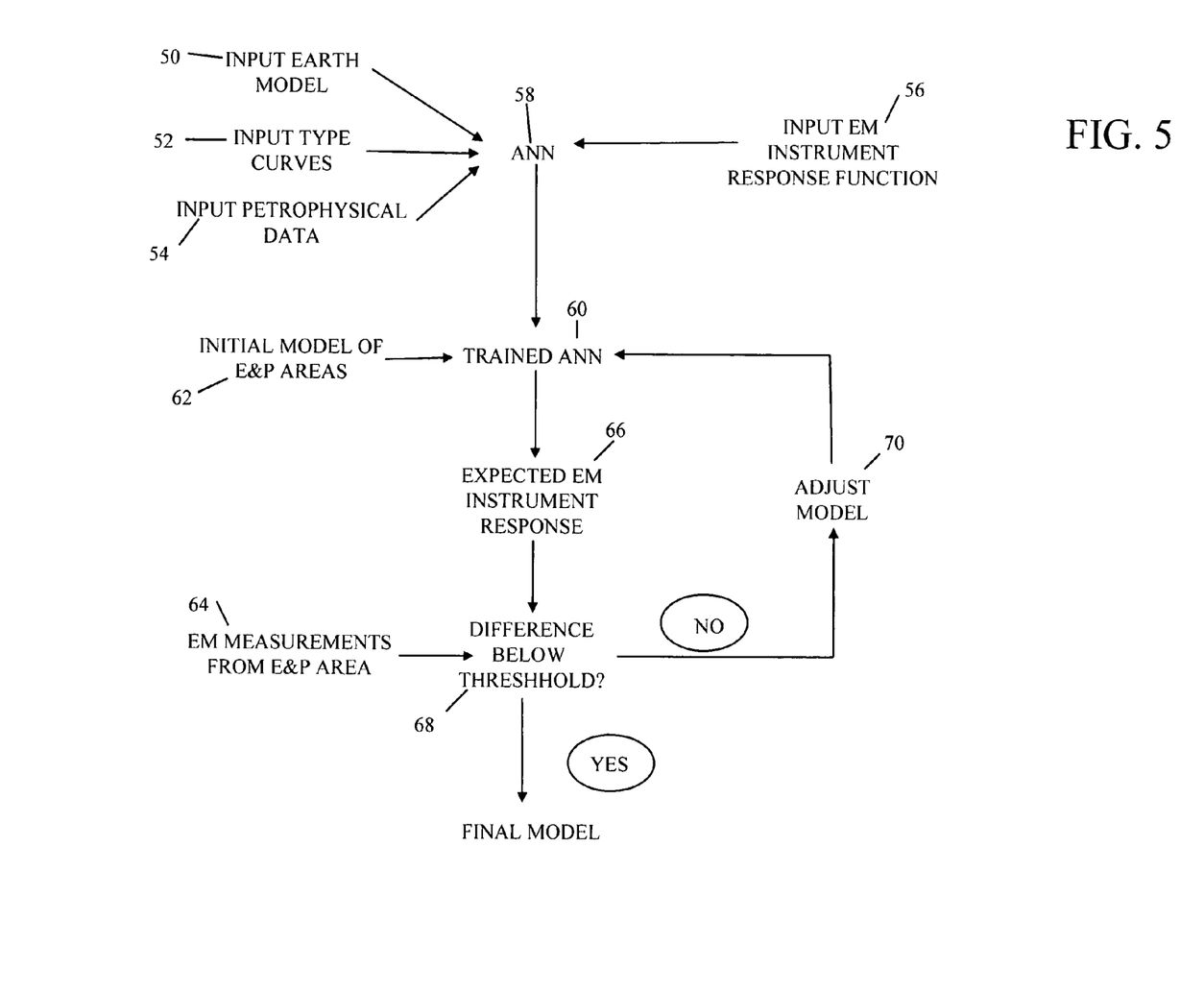
FIG. 5 shows a flow chart of one implementation of a process according to the invention.

A flow chart that explains one embodiment of a process according to the invention is shown in FIG. 5. An artificial neural network ("ANN") 58 in its initial state may be untrained. In the present embodiment, electromagnetic data 56 from a survey area or areas may be input to the ANN 58. From the same survey area, as available, Earth models 50 from the respective survey areas are input to the ANN. The Earth models 50 may include spatial distribution of electrical resistivity in the Earth's subsurface. If available, petrophysical data 54 for the survey areas are also input to the ANN 58. In the present embodiment, known type curves 52 as explained above, which may be from the survey areas of from any other source, are input to the ANN 58 to substantially increase the training speed. The result is a trained ANN 60. In interpretation of electromagnetic survey data from a new survey area, an initial model of the Earth's subsurface 62 in the survey area is input to the trained ANN 60. The initial model 62 may include spatial distribution of resistivity in three dimensions in the Earth's subsurface. The initial model 62 may be constrained by any available information, such as gravity surveys, seismic data and petrophysical data, for example. The trained ANN 60 generates as its output to the initial model 62 a set of expected electromagnetic instrument responses, shown at 66. The expected responses 66 are compared, at 68, to the measured responses of the electromagnetic instrument, such measured responses being acquired, for example, as explained above with reference to FIGS. 1 through 4. If the differences between the measured response and the expected response are not below a selected threshold, then at 70 the model is adjusted and the expected response is recalculated in the trained ANN 60. The foregoing comparison, adjustment and recalculation procedure is repeated until the differences fall below the selected threshold.

Methods of training an ANN according to the invention may provide such improvement in the amount of time needed to train the ANN so as to make it practical to use the trained ANN to interpret electromagnetic survey data substantially in real time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for interpreting electromagnetic survey data, comprising:
   acquiring electromagnetic survey data near a top of a portion of the Earth's substrate using an electromagnetic survey instrument comprising horizontally distributed electromagnetic sensors;
   generating an initial model of the portion of the Earth's subsurface, the model including at least spatial distribution of formation resistivity within the portion;
   applying the initial model to an artificial neural network trained to generate expected electromagnetic survey instrument response to the initial model, said training of the artificial neural network including input of type curves representing response of the electromagnetic survey instrument to vertically layered formations including layers of monotonically increasing resistivity, layers of monotonically decreasing resistivity, central layer sandwiched between boundary layers with resistivity of central layer greater than that of boundary layers, and central layer sandwiched between boundary layers with conductivity of central layer greater than that of boundary layers;
   comparing the acquired electromagnetic survey data to an output of the artificial neural network; and
   adjusting the initial model, and repeating applying the model to the artificial neural network and the comparing until differences between the output of the network and the acquired survey data fall below a selected threshold; wherein the adjusted model when the differences fall below the selected threshold is a result of the method.

2. The method of claim 1 wherein the type curves comprise instrument responses to at least three adjacent formation layers.

3. The method of claim 2 wherein the type curves comprise combinations of responses to pluralities of at least three layer responses.

4. The method of claim 1 wherein the training of the neural network is constrained by a priori information of at least one petrophysical parameter.

5. The method of claim 1 wherein the acquiring electromagnetic survey data comprises:
   deploying the electromagnetic sensors in a predetermined pattern above the portion of the Earth's subsurface to be surveyed;
   applying at least one of an electric field and a magnetic field to the Earth in the vicinity of the sensors at a plurality of different positions, the electric field produced by passing an electrical current transient through electrodes, the magnetic field produced by passing an electrical current transient through an antenna;
   recording at least one of electric field amplitude and magnetic field amplitude at each of the sensors each time the at least one of the electric field and the magnetic field is applied to the Earth;
   adjusting each recording for acquisition geometry; and
   generating an image corresponding to at least one sensor position using at least two stacked, adjusted recordings.

6. The method of claim 5 wherein the electric current transient is generated by switching direct current.

7. The method of claim 6 wherein the switching comprises turning the direct current off.

8. The method of claim 6 wherein the switching comprises turning the direct current on.

9. The method of claim 6 wherein the switching comprises reversing the direct current polarity.

10. The method of claim 6 wherein the switching comprises changing the direct current polarity in a pseudo random binary sequence.

11. The method of claim 6 wherein the stacked recording comprises a median stack.

12. The method of claim 5 wherein electric field amplitudes are detected along two orthogonal directions.

13. The method of claim 5 wherein magnetic field amplitudes are detected along three mutually orthogonal directions.

14. The method of claim 5 wherein the sensors are deployed in a regular grid pattern having spacing between sensors of about 50 to 500 meters.

15. The method of claim 5 wherein the applying comprises applying the at least one of an electric field and a magnetic field along a direction parallel to a direction of deployment of the sensors.

16. The method of claim 5 wherein the applying comprises applying the at least one of an electric field and a magnetic field along a direction perpendicular to a direction of deployment of the sensors.

17. The method of claim 5 wherein the applying comprises applying the at least one of an electric field and a magnetic field along a selected direction oblique to a direction of deployment of the sensors, or along a sequence of selected oblique directions.

18. The method of claim 5 wherein the stacked image is derived from a set of recordings with a common mid point.

19. the method of claim 5 wherein the applying the at least one of an electric field and a magnetic field is performed at intervals of the order of ten meters or more.

20. The method of claim 5 wherein the electric current is applied to a dipole electrode in a substantially horizontal direction.

21. The method of claim 5 wherein the electric current is applied to a dipole electrode in substantially vertical direction.

22. the method of claim 5 wherein the magnetic field is oriented substantially vertically.

23. the method of claim 5 wherein the magnetic field is oriented substantially horizontally.

24. The method of claim 5 wherein the top of the portion of the Earth's subsurface is near a bottom of a body of water.

25. The method of claim 5 further comprising:
   deploying a plurality of seismic sensors in a selected pattern at the top of the portion of the Earth's subsurface;
   actuating a seismic energy source proximate the top of the area substantially contemporaneously with the recording at least one of the electric and magnetic field amplitudes; and
   recording signals generated by the seismic sensors in response to the actuation of the seismic energy source.

26. The method of claim 5 wherein the applying at least one of an electric field and a magnetic field to the Earth in the vicinity of the sensors comprises applying at least one of a rotating electric field and a rotating magnetic field to the Earth.

27. The method of claim 5 further comprising measuring at least one physical parameter from within a wellbore drilled through the Earth in the vicinity of the portion of the Earth's subsurface to be surveyed, and constraining the initial model using the measured physical parameter.

28. The method of claim 27 wherein the at least one physical parameter comprises at least one of electrical resistivity, seismic travel time, gravity, bulk density and neutron capture cross section.

* * * * *